United States Patent
Lee

(10) Patent No.: US 9,240,297 B2
(45) Date of Patent: Jan. 19, 2016

(54) TOUCH SCREEN PANEL

(71) Applicant: LG Display Co., Ltd., Seoul (KR)

(72) Inventor: Jaegyun Lee, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 93 days.

(21) Appl. No.: 14/049,586

(22) Filed: Oct. 9, 2013

(65) Prior Publication Data
US 2014/0110236 A1 Apr. 24, 2014

(30) Foreign Application Priority Data
Oct. 19, 2012 (KR) .................... 10-2012-0116811

(51) Int. Cl.
| | |
|---|---|
| H01H 9/26 | (2006.01) |
| H01H 13/72 | (2006.01) |
| H01H 13/76 | (2006.01) |
| H01H 13/704 | (2006.01) |
| G06F 3/044 | (2006.01) |

(52) U.S. Cl.
CPC ............ *H01H 13/704* (2013.01); *G06F 3/044* (2013.01)

(58) Field of Classification Search
CPC ............... H01H 2201/00; H01H 2203/008; H01H 2203/042; H01H 2205/012; H01H 2201/01; H01H 2207/012; H01H 2221/002; H01H 2239/074; H01H 9/26; H01H 13/72; H01H 13/76; H01H 13/00
See application file for complete search history.

(56) References Cited

U.S. PATENT DOCUMENTS

| | | | |
|---|---|---|---|
| 7,538,288 B1 * | 5/2009 | Huang ....................... | 200/512 |
| 2008/0309623 A1 | 12/2008 | Hotelling et al. | |
| 2010/0164889 A1 * | 7/2010 | Hristov et al. ............. | 345/173 |
| 2012/0013554 A1 | 1/2012 | Nam et al. | |

FOREIGN PATENT DOCUMENTS

| | | |
|---|---|---|
| EP | 2 275 861 A1 | 1/2011 |
| KR | 10-2012-0012005 A | 2/2012 |

OTHER PUBLICATIONS

Extended European Search Report dated Jan. 22, 2015, for European patent application No. 13186937.2.

* cited by examiner

*Primary Examiner* — Edwin A. Leon
*Assistant Examiner* — Anthony R. Jimenez
(74) *Attorney, Agent, or Firm* — Morgan, Lewis & Bockius LLP

(57) ABSTRACT

A touch screen panel includes a substrate having a touch area and a routing wiring area, a plurality of first electrode serials formed in a first direction in the touch area, a plurality of second electrode serials which are arranged in a second direction crossing the first direction in the touch area so that the first and second electrode serials do not contact, a plurality of first routing wires which are formed in the routing wiring area and are respectively connected to one ends of the first electrode serials, and a plurality of second routing wires which are formed in the routing wiring area and are respectively connected to one ends of the second electrode serials. Odd-numbered first routing wires and even-numbered first routing wires of the first routing wires are formed on different layers.

11 Claims, 12 Drawing Sheets

TOUCH SCREEN PANEL

This application claims the benefit of priority under 35 U.S.C. §119(a) to Korean Patent Application No. 10-2012-0116811 filed on Oct. 19, 2012, the entire contents of which is incorporated herein by reference herein in its entirety.

BACKGROUND OF THE INVENTION

1. Field of the Invention

Embodiments of the invention relate to a touch screen panel, and more particularly, to a touch screen panel having a routing wire structure capable of reducing a bezel size.

2. Discussion of the Related Art

Recently, various input devices such as a keyboard, a mouse, a trackball, a joystick, and a digitizer have been used to configure an interface between users and home appliances or various kinds of information communication equipments. However, the above-described input devices cause inconveniences of learning how to use them and taking up space, thus making it difficult to improve the degree of completion of the product. Thus, demand for input devices with a simple and convenient interface and capable of reducing malfunction due to inaccurate input is growing daily. In response to this demand, a touch screen panel for enabling a user to input information by directly touching the screen with his or her hand or a pen was suggested.

Touch screen panels are classified into a resistive type, a capacitive type, an electromagnetic type, etc. based on a method for sensing a touched portion. The resistive touch screen panel determines a touched position by a voltage gradient based on changes of resistance in a state that a DC voltage is applied to metal electrodes formed on an upper plate or a lower plate. The capacitive touch screen panel senses a touched position based on changes in capacitance generated in an upper plate or a lower plate when the user touches an equipotential conductive film formed on the upper or lower plate. The electromagnetic touch screen panel senses a touched portion by reading an LC value induced when an electronic pen touches a conductive film. In addition, an optical touch screen panel, an ultrasonic touch screen panel, etc. are known.

In general, these types of touch screen panels include a touch area for touch recognition and a routing wiring area and a pad area which are formed outside the touch area so as to transmit and receive signals to and from touch electrodes formed in the touch area. In the disclosure, the routing wiring area and the pad area are defined as a bezel area. The size of the bezel area increases as the number of channels for connecting routing wires increases due to an increase in the size of the touch area and widths of the routing wires increase.

A related art touch screen panel is described below with reference to FIGS. 1A and 1B.

FIG. 1A is a plane view of a related art touch screen panel, in which touch electrodes are formed on one surface of a transparent substrate. FIG. 1B is a cross-sectional view taken along line I-I' of FIG. 1A.

As shown in FIGS. 1A and 1B, the related art touch screen panel includes a touch area A in which a touch operation is performed, a routing wiring area B in which routing wires and routing pads are formed so as to transmit and receive signals to and from the touch area A, and a pad area C.

The touch area A includes a plurality of first touch electrode serials TS arranged in parallel in a first direction (for example, x-axis direction) on a transparent substrate 10, and a plurality of second touch electrode serials RS which are arranged in parallel in a second direction (for example, y-axis direction) on the transparent substrate 10 with an insulating layer INS interposed between the first and second touch electrode serials TS and RS and cross the first touch electrode serials TS. In other words, the plurality of first touch electrode serials TS and the plurality of second touch electrode serials RS cross each other and are disposed with the insulating layer INS interposed between them so that they do not contact each other.

The routing wiring area B is formed outside the touch area A including the first and second touch electrode serials TS and RS. The routing wiring area B includes a plurality of first routing wires TW respectively connected to the plurality of first touch electrode serials TS and a plurality of second routing wires RW respectively connected to the plurality of second touch electrode serials RS.

The pad area C includes a plurality of first routing pads TP respectively connected to the plurality of first routing wires TW and a plurality of second routing pads RP respectively connected to the plurality of second routing wires RW.

Another related art touch screen panel is described below with reference to FIGS. 2A to 2C.

FIG. 2A is a plane view of a related art touch screen panel, in which bar-shaped touch electrodes are formed on both surfaces of a transparent substrate. FIG. 2B is a cross-sectional view taken along line I-I' of FIG. 2A. FIG. 2C is a cross-sectional view taken along line II-II' of FIG. 2A.

As shown in FIGS. 2A to 2C, the related art touch screen panel includes a touch area A in which a touch operation is performed, a routing wiring area B in which routing wires and routing pads are formed so as to transmit and receive signals to and from the touch area A, and a pad area C.

The touch area A includes a plurality of first touch electrode serials TS arranged in parallel in a first direction (for example, x-axis direction) on one surface of a transparent substrate 10, and a plurality of second touch electrode serials RS which are arranged in parallel in a second direction (for example, y-axis direction) on the other surface of the transparent substrate 10 and cross the first touch electrode serials TS.

The routing wiring area B is formed outside the touch area A including the first and second touch electrode serials TS and RS. The routing wiring area B includes a plurality of first routing wires TW respectively connected to the plurality of first touch electrode serials TS on the one surface of the transparent substrate 10 and a plurality of second routing wires RW respectively connected to the plurality of second touch electrode serials RS on the other surface of the transparent substrate 10.

The pad area C includes a plurality of first routing pads TP respectively connected to the plurality of first routing wires TW on the one surface of the transparent substrate 10 and a plurality of second routing pads RP respectively connected to the plurality of second routing wires RW on the other surface of the transparent substrate 10.

In the touch screen panel shown in FIGS. 1A and 1B, because the first and second routing wires TW and RW and the first and second routing pads TP and RP are formed on the same layer, the size of a bezel area is determined by widths of the first and second routing wires TW and RW formed in the routing wiring area B, a distance between the first and second routing wires TW and RW, and the sizes of the first and second routing pads TP and RP formed in the pad area C. However, the first and second routing pads TP and RP occupy only a portion of the bezel area and thus scarcely affect the size of the bezel area. Therefore, the widths of the routing wires TW and RW are substantially important to the size of the bezel area.

Further, in the touch screen panel shown in FIGS. 2A to 2C, because the first routing wires TW and the first routing pads TP are formed on the same layer and the second routing wires RW and the second routing pads RP are formed on the same layer, the size of a bezel area is determined by widths of the first routing wires TW formed in the routing wiring area B, a distance between the first routing wires TW, and the sizes of the first routing pads TP formed in the pad area C, or widths of the second routing wires RW formed in the routing wiring area B, a distance between the second routing wires RW, and the sizes of the second routing pads RP formed in the pad area C. The first and second routing pads TP and RP occupy only a portion of the bezel area and thus scarcely affect the size of the bezel area. Therefore, the widths of the routing wires TW and RW are substantially important to the size of the bezel area.

However, when the widths of the routing wires decrease so as to reduce the size of the bezel area, resistances of the routing wires increase. Hence, a performance of the touch screen panel is reduced.

SUMMARY OF THE INVENTION

Embodiments of the invention provide a touch screen panel capable of reducing the size of a bezel area by forming first or second routing wires on not the same layer but different layers to reduce an entire area occupied by the first and second routing wires without reducing widths of the first and second routing wires.

In one aspect, there is a touch screen panel comprising a substrate having a touch area and a routing wiring area, a plurality of first electrode serials which are formed in the touch area of the substrate and are arranged in a first direction, a plurality of second electrode serials which are formed in the touch area of the substrate and are arranged in a second direction crossing the first direction so that the plurality of second electrode serials do not contact the plurality of first electrode serials, a plurality of first routing wires which are formed in the routing wiring area of the substrate and are respectively connected to one ends of the plurality of first electrode serials, and a plurality of second routing wires which are formed in the routing wiring area of the substrate and are respectively connected to one ends of the plurality of second electrode serials, wherein odd-numbered first routing wires and even-numbered first routing wires of the plurality of first routing wires are formed on different layers.

Odd-numbered second routing wires and even-numbered second routing wires of the plurality of second routing wires are formed on different layers.

The touch screen panel further comprises an insulating layer formed at crossings of the plurality of first electrode serials and the plurality of second electrode serials so that the plurality of first electrode serials do not contact the plurality of second electrode serials. The odd-numbered first routing wires and the even-numbered first routing wires of the plurality of first routing wires are separated from each other by the insulating layer.

The odd-numbered second routing wires and the even-numbered second routing wires of the plurality of second routing wires are separated from each other by the insulating layer.

The plurality of first electrode serials are formed on a first surface of the substrate, and the plurality of second electrode serials are formed on a second surface opposite the first surface of the substrate.

The odd-numbered first routing wires and the even-numbered first routing wires of the plurality of first routing wires are formed on the first surface and the second surface of the substrate.

The odd-numbered second routing wires and the even-numbered second routing wires of the plurality of second routing wires are formed on the first surface and the second surface of the substrate.

The odd-numbered first routing wires or the even-numbered first routing wires formed on the first surface or the second surface of the substrate are respectively connected to odd-numbered first electrode serials or even-numbered first electrode serials formed on the first surface or the second surface of the substrate through a contact hole formed in the substrate.

The odd-numbered second routing wires or the even-numbered second routing wires formed on the first surface or the second surface of the substrate are respectively connected to odd-numbered second electrode serials or even-numbered second electrode serials formed on the first surface or the second surface of the substrate through a contact hole formed in the substrate.

In the touch screen panel according to the embodiments of the invention, because the odd-numbered routing wires and the even-numbered routing wires are formed on not the same layer but different layers, it is not necessary to secure a distance between the odd-numbered routing wires and the even-numbered routing wires so that they do not contact each other. Thus, the size of the routing wiring area occupied by the routing wires may decrease, and thus the size of a bezel area may decrease.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1A:
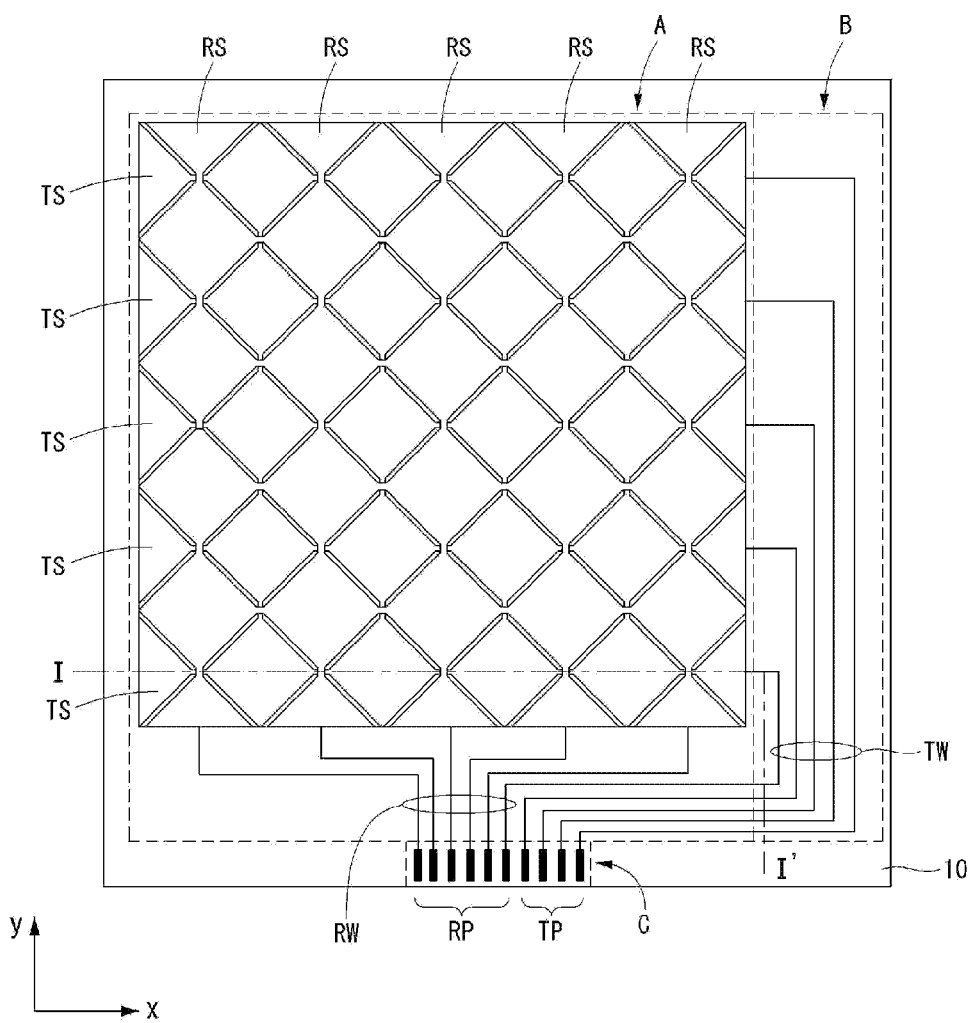
FIG. 1A is a plane view of a related art touch screen panel, in which touch electrodes are formed on one surface of a transparent substrate.
Figure 1B:
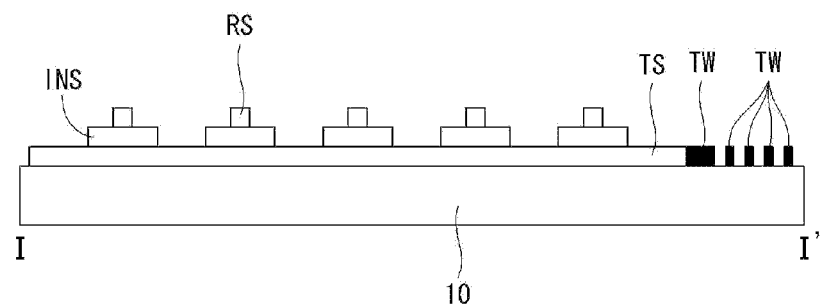
FIG. 1B is a cross-sectional view taken along line I-I' of FIG. 1A.
Figure 2A:
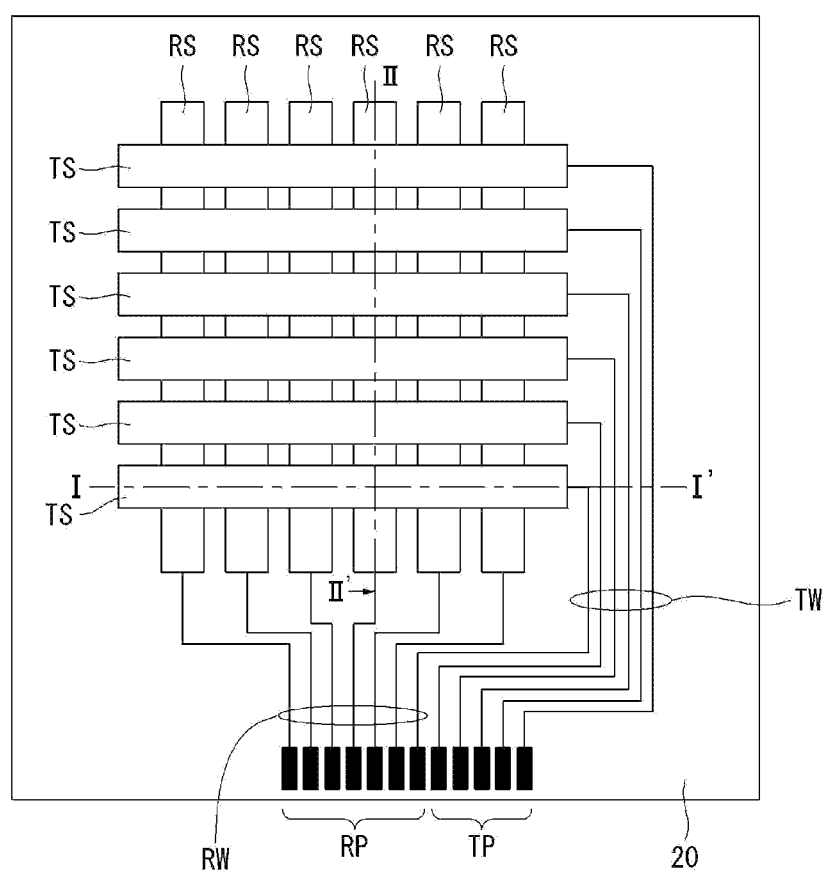
FIG. 2A is a plane view of a related art touch screen panel, in which bar-shaped touch electrodes are formed on both surfaces of a transparent substrate.
Figure 2B:
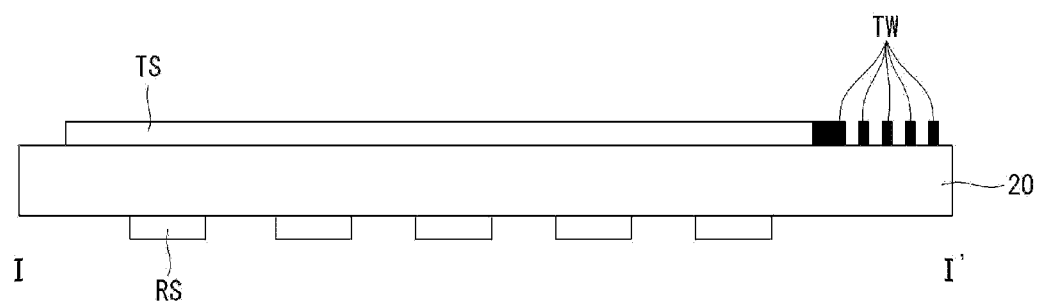
FIG. 2B is a cross-sectional view taken along line I-I' of FIG. 2A.
Figure 2C:
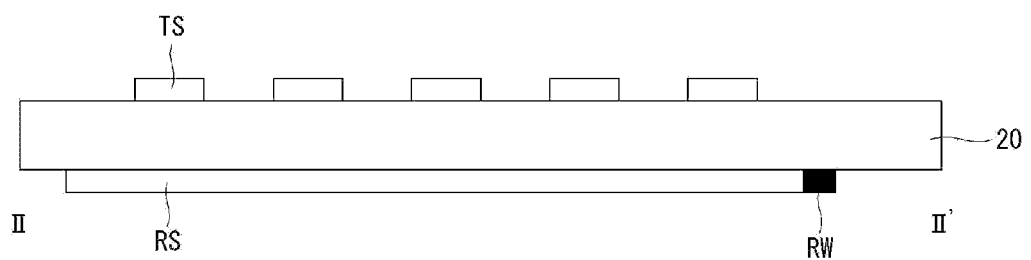
FIG. 2C is a cross-sectional view taken along line II-II' of FIG. 2A.
Figure 3A:
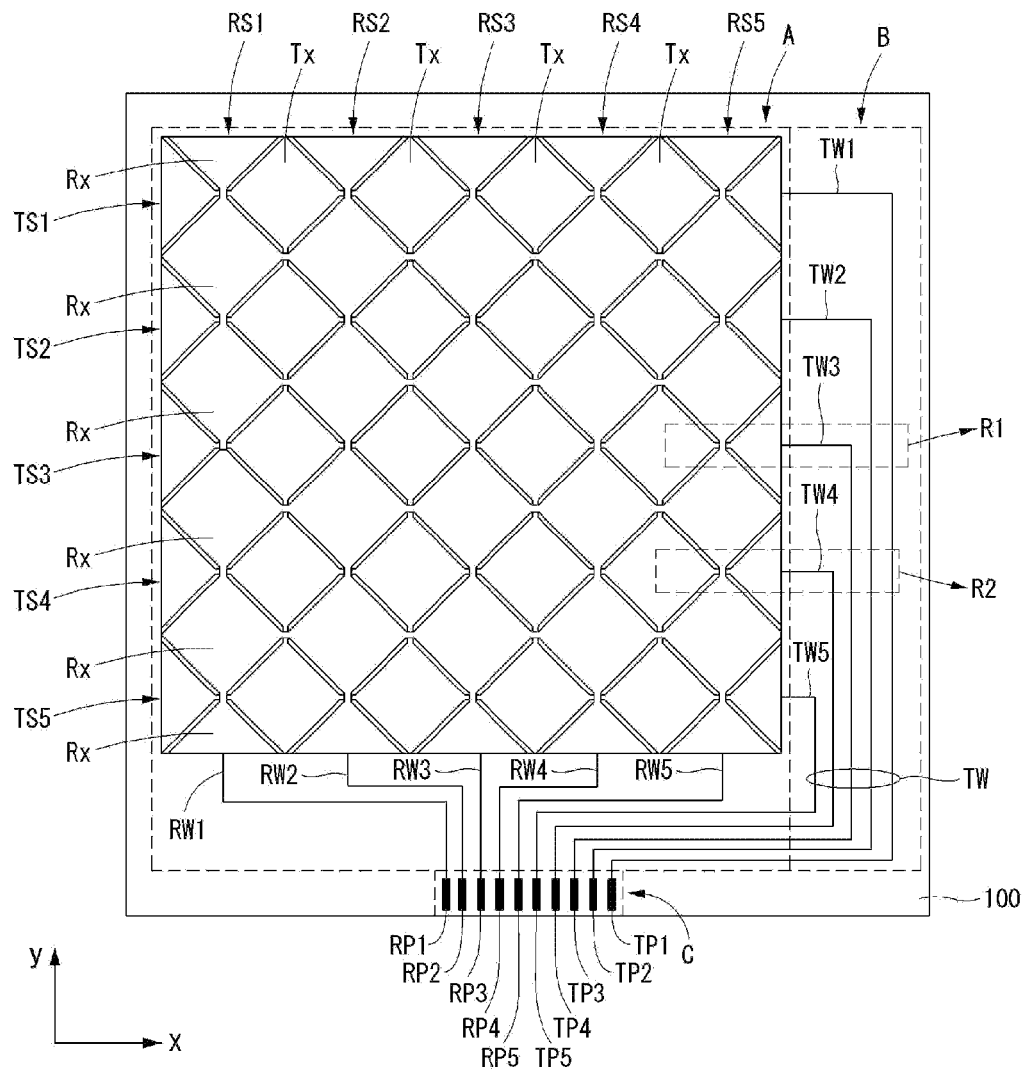
FIG. 3A is a plane view of a touch screen panel according to a first embodiment of the invention.
Figure 3B:
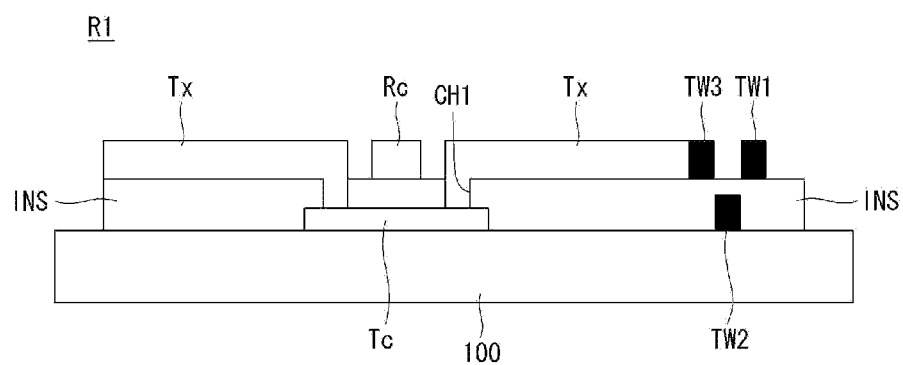
FIG. 3B is a cross-sectional view showing a portion $R_1$ of FIG. 3A.
Figure 3C:
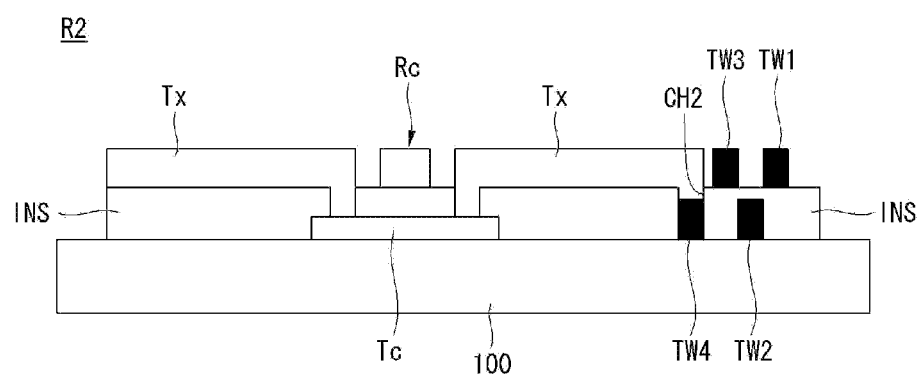
FIG. 3C is a cross-sectional view showing a portion $R_2$ of FIG. 3A.

A touch screen panel according to a first embodiment of the invention is described below with reference to FIGS. 3A to 3C. FIG. 3A is a plane view of the touch screen panel according to the first embodiment of the invention. FIG. 3B is a cross-sectional view showing a portion R1 of FIG. 3A. FIG. 3C is a cross-sectional view showing a portion R2 of FIG. 3A.

As shown in FIGS. 3A to 3C, the touch screen panel according to the first embodiment of the invention includes a touch area A in which a touch operation is performed, a routing wiring area B in which routing wires used to transmit and receive a touch driving signal and a touch sensing signal are formed, and a pad area C for the connection to a touch controller.

The touch area A includes a plurality of first touch electrode serials TS arranged in parallel in a first direction (for example, x-axis direction) on a transparent substrate 100, and a plurality of second touch electrode serials RS which are arranged in parallel in a second direction (for example, y-axis direction) on the transparent substrate 100 to cross the first touch electrode serials TS. An insulating layer INS is interposed between the first and second touch electrode serials TS and RS.

Each of the first touch electrode serials TS includes a plurality of first electrode patterns Tx and a plurality of first connecting patterns Tc for connecting the adjacent first electrode patterns Tx. Each of the second touch electrode serials RS includes a plurality of second electrode patterns Rx and a plurality of second connecting patterns Rc for connecting the adjacent second electrode patterns Rx. The first connecting patterns Tc of the first touch electrode serial TS and the second connecting patterns Rc of the second touch electrode serial RS are disposed with the insulating layer INS interposed between them and cross each other, so that they do not contact each other.

The first electrode patterns Tx of the first touch electrode serial TS are formed on the insulating layer INS, and the first connecting patterns Tc are formed on the transparent substrate 100. The adjacent first electrode patterns Tx are connected to each other by the first connecting pattern Tc exposed through a first contact hole CH1 formed in the insulating layer INS. The second electrode patterns Rx and the second connecting patterns Rc of the second touch electrode serial RS are formed on the insulating layer INS.

FIG. 3A shows that the first and second electrode patterns Tx and Rx are formed on the insulating layer INS and the adjacent first electrode patterns Tx are connected to each other by the first connecting pattern Tc. However, the embodiment of the invention is not limited thereto. For example, all of the first and second electrode patterns Tx and Rx may be formed on the transparent substrate 100, and an insulating pattern may be formed only at crossings of the first and second connecting patterns Tc and Rc so that the first and second electrode patterns Tx and Rx do not contact each other.

Further, FIG. 3A shows that the first and second electrode patterns Tx and Rx have a rectangle shape. However, the embodiment of the invention is not limited thereto. For example, the first and second electrode patterns Tx and Rx may have various shapes including a triangle shape, a hive shape, a polygon shape, and a combination thereof.

The routing wiring area B is formed outside the touch area A including the first and second touch electrode serials TS and RS. The routing wiring area B includes a plurality of first routing wires TW1 to TW5 and a plurality of second routing wires RW1 to RW5.

The plurality of first routing wires TW1 to TW5 are alternately formed on the transparent substrate 100 and the insulating layer INS. In an example illustrated in FIGS. 3B and 3C, the odd-numbered first routing wires TW1, TW3, and TW5 are formed on the insulating layer INS, and the even-numbered first routing wires TW2 and TW4 are formed on the transparent substrate 100. One ends of the odd-numbered first routing wires TW1, TW3, and TW5 formed on the insulating layer INS are respectively connected to the odd-numbered first electrode serials TS1, TS3, and TS5 on the insulating layer INS. One ends of the even-numbered first routing wires TW2 and TW4 formed on the transparent substrate 100 are respectively connected to the even-numbered first electrode serials TS2 and TS4 through a second contact hole CH2 of the insulating layer INS.

In the same manner as the first routing wires TW1 to TW5, the plurality of second routing wires RW1 to RW5 are alternately formed on the transparent substrate 100 and the insulating layer INS. In the example illustrated in FIGS. 3B and 3C, the odd-numbered second routing wires RW1, RW3, and RW5 are formed on the insulating layer INS, and the even-numbered second routing wires RW2 and RW4 are formed on the transparent substrate 100. One ends of the odd-numbered second routing wires RW1, RW3, and RW5 formed on the insulating layer INS are respectively connected to the odd-numbered second electrode serials RS1, RS3, and RS5 on the insulating layer INS. One ends of the even-numbered second routing wires RW2 and RW4 formed on the transparent substrate 100 are respectively connected to the even-numbered second electrode serials RS2 and RS4 through a contact hole (not shown) of the insulating layer INS.

The first embodiment of the invention described the touch screen panel, in which the plurality of first and second routing wires TW1 to TW5 and RW1 to RW5 are alternately formed on the transparent substrate 100 and the insulating layer INS, but is not limited thereto. It should be understood that the fact, that the plurality of first and second routing wires TW1 to TW5 and RW1 to RW5 are dividedly formed on the transparent substrate 100 and the insulating layer INS, is pertained in the scope of the embodiments of the invention.

The pad area C is formed outside the routing wiring area B and includes a plurality of first routing pads TP1 to TP5 and a plurality of second routing pads RP1 to RP5.

The plurality of first routing pads TP1 to TP5 are respectively connected to the other ends of the plurality of first routing wires TW1 to TW5, and the plurality of second routing pads RP1 to RP5 are respectively connected to the other ends of the plurality of second routing wires RW1 to RW5.

In the touch screen panel according to the first embodiment of the invention, the first routing wires TW1 to TW5 are alternately formed on the transparent substrate 100 and the insulating layer INS, and also the second routing wires RW1 to RW5 are alternately formed on the transparent substrate 100 and the insulating layer INS. Therefore, the odd-numbered first routing wires TW1, TW3, and TW5 and the even-numbered first routing wires TW2 and TW4 are formed on the different layers, and also the odd-numbered second routing wires RW1, RW3, and RW5 and the even-numbered second routing wires RW2 and RW4 are formed on the different layers. Hence, it is not necessary to secure a distance between the odd-numbered routing wires and the even-numbered routing wires.

On the other hand, in a related art touch screen panel, odd-numbered first routing wires and even-numbered first routing wires are formed on the same layer, and odd-numbered second routing wires and even-numbered second routing wires are formed on the same layer. Therefore, the odd-numbered routing wires and the even-numbered routing wires have to be separated from each other at a predetermined distance, so that they do not contact each other.

Accordingly, in the touch screen panel according to the first embodiment of the invention, although a distance between the odd-numbered routing wires and the even-numbered routing wires is not secured, the odd-numbered routing wires and the even-numbered routing wires not contact each other because they are formed on and under the insulating layer respectively. Therefore, the size of the routing wiring area B occupied by the routing wires may decrease, and thus the size of the bezel area may decrease.

The touch screen panel according to the first embodiment of the invention shown in FIGS. 3A to 3C described that the odd-numbered first routing wires and the odd-numbered second routing wires are formed on the insulating layer, and the even-numbered first routing wires and the even-numbered second routing wires are formed on the transparent substrate, as an example of configuration, but is not limited thereto. For example, the odd-numbered first routing wires and the even-numbered second routing wires may be formed on the insulating layer, and the even-numbered first routing wires and the odd-numbered second routing wires may be formed on the transparent substrate. Alternatively, the even-numbered first routing wires and the even-numbered second routing wires may be formed on the insulating layer, and the odd-numbered first routing wires and the odd-numbered second routing wires may be formed on the transparent substrate. Alternatively, the even-numbered first routing wires and the odd-numbered second routing wires may be formed on the insulating layer, and the odd-numbered first routing wires and the even-numbered second routing wires may be formed on the transparent substrate.

Figure 4:
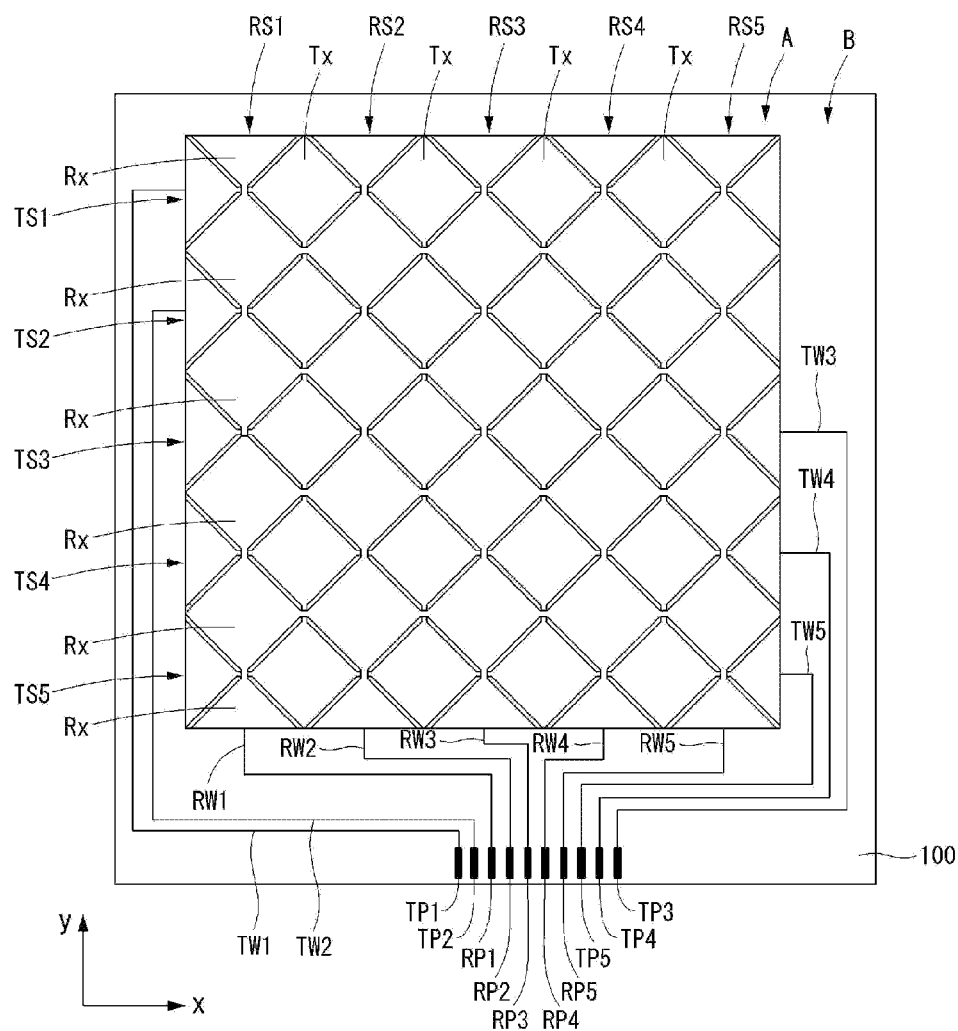
FIG. 4 is a plane view showing a modification embodiment of the touch screen panel according to the first embodiment of the invention.

FIG. 4 is a plane view showing a modification embodiment of the touch screen panel according to the first embodiment of the invention. The modification embodiment shown in FIG. 4 is different from the first embodiment of the invention, in that the first routing wires TW1 to TW5 are dividedly formed on both sides of the touch area A. Thus, only a difference between the first embodiment and the modification embodiment of the invention is described below.

As shown in FIG. 4, some TW1 and TW2 of the first routing wires TW1 to TW5 are formed on the left side of the touch area A, and the remaining first routing wires TW3, TW4, and TW5 are formed on the right side of the touch area A. In the same manner as the first embodiment shown in FIG. 3A, the odd-numbered first routing wires TW1, TW3, and TW5 and the even-numbered first routing wires TW2 and TW4 are alternately formed on the transparent substrate 100 and the insulating layer (not shown).

The first embodiment shown in FIG. 3A and the modification embodiment shown in FIG. 4 illustrate that the first routing wires are connected only to one end of the first electrode serial, but are not limited thereto. For example, the embodiments of the invention may be applied to a double routing wiring structure, in which the first routing wires are connected to both ends of the first electrode serial and signals are transmitted and received through the both ends of the first electrode serial. In this instance, the odd-numbered first routing wires and the even-numbered second routing wires are alternately formed on the insulating layer and the transparent substrate. Hence, the same effect as the first embodiment of the invention may be obtained.

Figure 5:
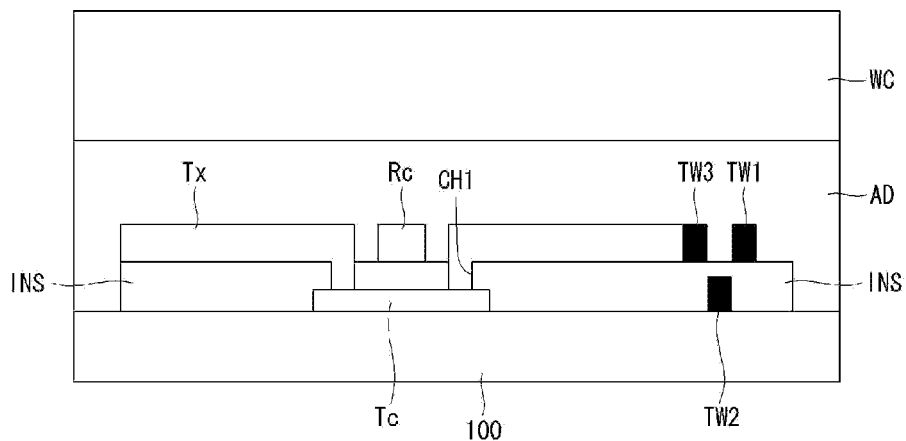
FIG. 5 is a cross-sectional view showing an example of applying a window cover to the touch screen panel according to the first embodiment of the invention.
Figure 6:
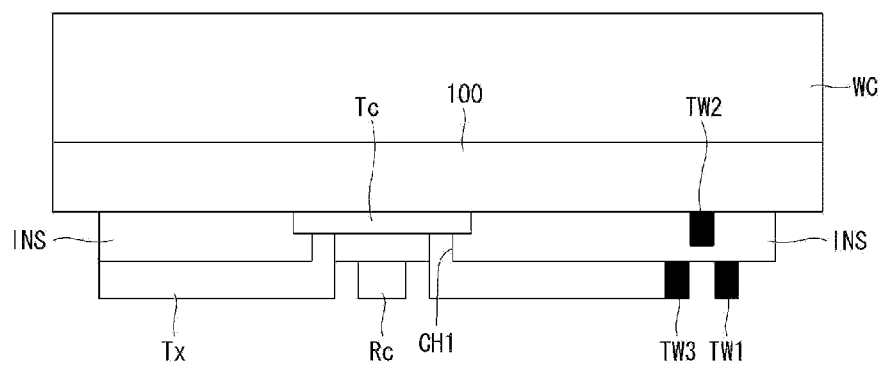
FIG. 6 is a cross-sectional view showing another example of applying a window cover to the touch screen panel according to the first embodiment of the invention.

Examples of applying a window cover, such as a reinforced glass, to the touch screen panel according to the first embodiment and the modification embodiment of the invention are described below with reference to FIGS. 5 and 6. FIG. 5 is a cross-sectional view showing an example of applying a window cover to the touch screen panel according to the first embodiment of the invention. FIG. 6 is a cross-sectional view showing another example of applying a window cover to the touch screen panel according to the first embodiment of the invention.

As shown in FIG. 5, the touch screen panel according to the first embodiment of the invention is attached to a window cover WC, such as a reinforced glass, using an adhesive AD and thus may be used more stably. As described above, an additional effect capable of protecting the touch screen panel may be obtained by attaching the window cover WC to the touch screen panel.

As shown in FIG. 6, the touch screen panel uses a window cover WC, such as a reinforced glass, instead of the transparent substrate 100 shown in FIG. 3A. In this instance, because the first and second electrode serials TS1 to TS5 and RS1 to RS5, the first and second routing wires TW1 to TW5 and RW1 to RW5, and the first and second routing pads TP1 to TP5 and RP1 to RP5 are directly formed on the window cover WC, the effect capable of protecting the touch screen panel may be obtained by the window cover WC.

Figure 7A:
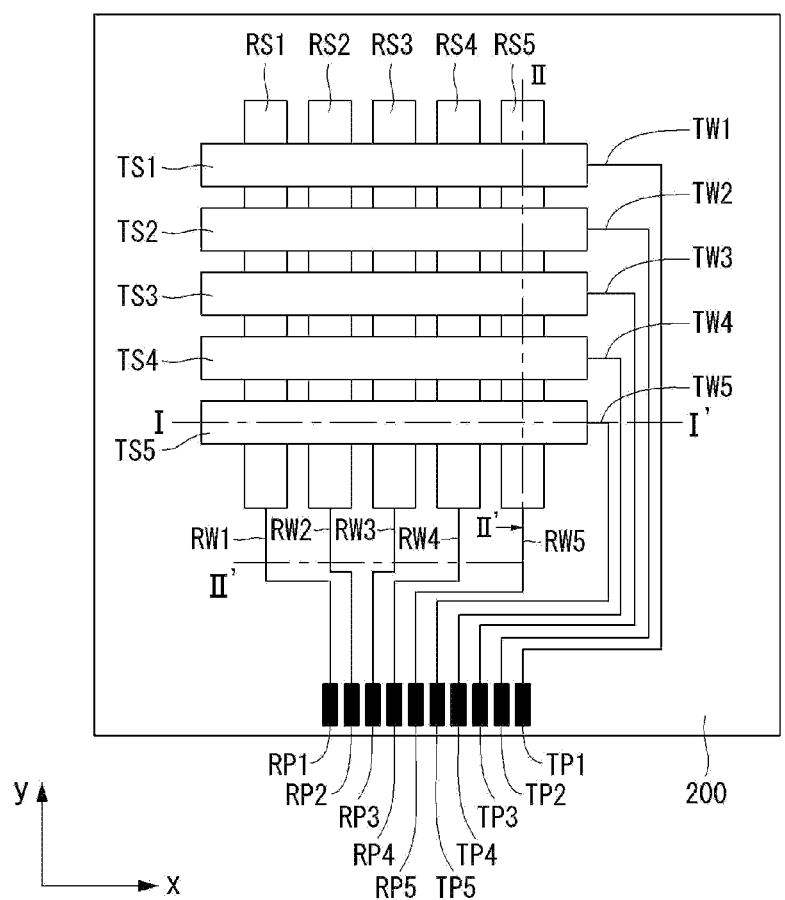
FIG. 7A is a plane view of a touch screen panel according to a second embodiment of the invention.
Figure 7B:
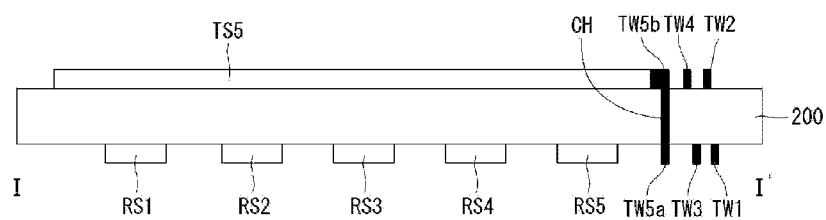
FIGS. 7B and 7C are cross-sectional views taken along line I-I' of FIG. 7A.
Figure 7C:
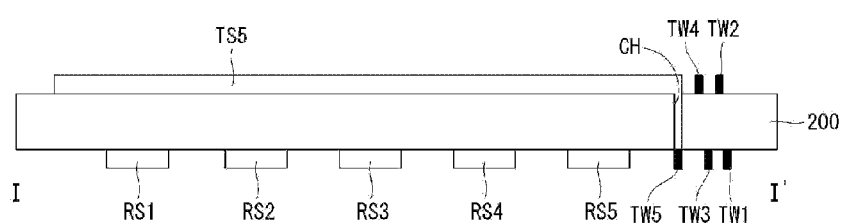
Figure 7D:
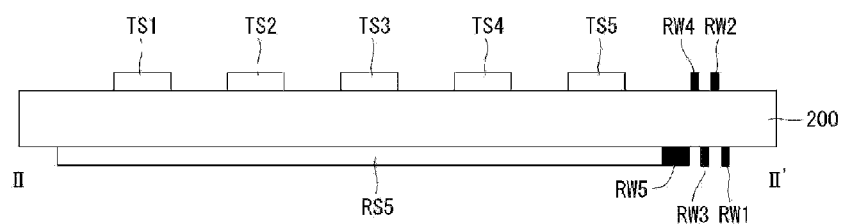
FIG. 7D is a cross-sectional view taken along line II-II' of FIG. 7A.

Next, a touch screen panel according to a second embodiment of the invention is described with reference to FIGS. 7A to 7D. FIG. 7A is a plane view of the touch screen panel according to the second embodiment of the invention. FIGS. 7B and 7C are cross-sectional views taken along line I-I' of FIG. 7A. FIG. 7D is a cross-sectional view taken along line II-II' of FIG. 7A.

As shown in FIGS. 7A to 7D, the touch screen panel according to the second embodiment of the invention includes a touch area A in which a touch operation is performed, a routing wiring area B in which routing wires used to transmit and receive a touch driving signal and a touch sensing signal are formed, and a pad area C for the connection to a touch controller.

The touch area A includes a plurality of first touch electrode serials TS arranged in parallel in a first direction (for example, x-axis direction) on one surface of a transparent substrate 200, and a plurality of second touch electrode serials RS which are arranged in parallel in a second direction (for example, y-axis direction) on the other surface of the transparent substrate 200 to cross the first touch electrode serials TS.

FIG. 7A shows that the first and second touch electrode serials TS and RS have a bar shape. However, the embodiment of the invention is not limited thereto. For example, each of the first and second touch electrode serials TS and RS may include a plurality of electrode patterns having a triangle shape, a hive shape, a polygon shape, a circle shape, an oral shape, or a combination thereof.

The routing wiring area B is formed outside the touch area A including the first and second touch electrode serials TS and RS. The routing wiring area B includes a plurality of first routing wires TW1 to TW5 and a plurality of second routing wires RW1 to RW5.

The plurality of first routing wires TW1 to TW5 are alternately formed on one surface and the other surface of the transparent substrate 200. In an example illustrated in FIGS. 7B and 7C, the odd-numbered first routing wires TW1, TW3, and TW5 are formed on one surface (for example, a lower surface of the transparent substrate 200 in FIGS. 7A to 7C) of the transparent substrate 200, and the even-numbered first routing wires TW2 and TW4 are formed on the other surface (for example, an upper surface of the transparent substrate 200 in FIGS. 7A to 7C) of the transparent substrate 200. One ends of the odd-numbered first routing wires TW1, TW3, and TW5 formed on the lower surface of the transparent substrate 200 are respectively connected to the odd-numbered first electrode serials TS1, TS3, and TS5 on the upper surface of the transparent substrate 200 through a contact hole CH.

In the touch screen panel shown in FIG. 7A, the first electrode serials TS1 to TS5 are formed on the upper surface of the transparent substrate 200, and the odd-numbered first routing wires TW1, TW3, and TW5 are formed on the lower surface of the transparent substrate 200. Therefore, the transparent substrate 200 has the contact holes CH for respectively connecting the odd-numbered first routing wires TW1, TW3, and TW5 to the odd-numbered first electrode serials TS1, TS3, and TS5.

In this instance, as shown in FIG. 7B, odd-numbered 1-1 routing wires (for example, fifth 1-1 routing wires TW5a in FIG. 7B) are formed on the lower surface of the transparent substrate 200. Further, odd-numbered 1-2 routing wires (for example, fifth 1-2 routing wires TW5b in FIG. 7B) are formed on the upper surface of the transparent substrate 200 and in the contact hole CH, so that the odd-numbered 1-2 routing wires TW5b are connected to the odd-numbered first electrode serials TS1, TS3, and TS5 and the odd-numbered 1-1 routing wires TW5a.

It is a matter of course that the odd-numbered 1-1 routing wires TW5a may be formed on the lower surface of the transparent substrate 200 and in the contact hole CH, and the odd-numbered 1-2 routing wires TW5b may be formed on the upper surface of the transparent substrate 200, so that the odd-numbered 1-2 routing wires TW5b are connected to the odd-numbered first electrode serials TS1, TS3, and TS5 and the odd-numbered 1-1 routing wires TW5a.

Alternatively, as shown in FIG. 7C, the odd-numbered first routing wires TW1, TW3, and TW5 may be formed only on the lower surface of the transparent substrate 200, and the odd-numbered first electrode serials TS1, TS3, and TS5 formed on the transparent substrate 200 may be respectively connected to the odd-numbered first routing wires TW1, TW3, and TW5 through the contact holes CH.

One ends of the even-numbered first routing wires TW2 and TW4 formed on the upper surface of the transparent substrate 200 are respectively connected to the even-numbered first electrode serials TS2 and TS4 formed on the upper surface of the transparent substrate 200.

In the same manner as the first routing wires TW1 to TW5, the plurality of second routing wires RW1 to RW5 are alternately formed on one surface and the other surface of the transparent substrate 200. The odd-numbered second routing wires RW1, RW3, and RW5 are formed on one surface (for example, the lower surface) of the transparent substrate 200, and the even-numbered second routing wires RW2 and RW4 are formed on the other surface (for example, the upper surface) of the transparent substrate 200.

One ends of the odd-numbered second routing wires RW1, RW3, and RW5 formed on the lower surface of the transparent substrate 200 are respectively connected to the odd-numbered second electrode serials RS1, RS3, and RS5 on the lower surface of the transparent substrate 200. Further, one ends of the even-numbered second routing wires RW2 and RW4 formed on the upper surface of the transparent substrate 200 are respectively connected to the even-numbered second electrode serials RS2 and RS4 through a contact hole (not shown) formed in the transparent substrate 200. Since a detailed connection relationship between the second electrode serials RS1 to RS5 formed on the lower surface of the transparent substrate 200 and the second routing wires RW1 to RW5 is similar to a connection relationship between the first electrode serials TS1 to TS5 formed on the upper surface of the transparent substrate 200 and the first routing wires TW1 to TW5, a description of the connection relationship is omitted.

The pad area C is formed outside the routing wiring area B and includes a plurality of first routing pads TP1 to TP5 and a plurality of second routing pads RP1 to RP5.

The plurality of first routing pads TP1 to TP5 are respectively connected to the other ends of the plurality of first routing wires TW1 to TW5, and the plurality of second routing pads RP1 to RP5 are respectively connected to the other ends of the plurality of second routing wires RW1 to RW5.

In the touch screen panel according to the second embodiment of the invention, the first routing wires TW1 to TW5 are alternately formed on one surface (for example, the lower surface) and the other surface (for example, the upper surface) of the transparent substrate 200, and also the second routing wires RW1 to RW5 are alternately formed on one surface (for example, the lower surface) and the other surface (for example, the upper surface) of the transparent substrate 200. Therefore, the odd-numbered first routing wires TW1, TW3, and TW5 and the even-numbered first routing wires TW2 and TW4 are formed on the different layers, and also the odd-numbered second routing wires RW1, RW3, and RW5 and the even-numbered second routing wires RW2 and RW4 are formed on the different layers. Hence, it is not necessary to secure a distance between the odd-numbered routing wires and the even-numbered routing wires so that they do not contact each other.

On the other hand, in the related art touch screen panel, the odd-numbered first routing wires and the even-numbered first routing wires are formed on the same layer, and the odd-numbered second routing wires and the even-numbered second routing wires are formed on the same layer. Therefore, the odd-numbered routing wires and the even-numbered routing wires have to be separated from each other at a predetermined distance, so that they do not contact each other.

Accordingly, in the touch screen panel according to the second embodiment of the invention, although a distance between the odd-numbered routing wires and the even-numbered routing wires is not secured, the odd-numbered routing wires and the even-numbered routing wires not contact each other because they are separated from each other. Therefore, the size of the routing wiring area B occupied by the routing wires may decrease, and thus the size of the bezel area may decrease.

The touch screen panel according to the second embodiment of the invention shown in FIGS. 7A to 7D described that the odd-numbered first routing wires and the odd-numbered second routing wires are formed on one surface (for example, the lower surface) of the transparent substrate, and the even-numbered first routing wires and the even-numbered second routing wires are formed on the other surface (for example, the upper surface) of the transparent substrate, as an example of configuration, but is not limited thereto.

For example, the odd-numbered first routing wires and the even-numbered second routing wires may be formed on one surface (for example, the lower surface) of the transparent substrate, and the even-numbered first routing wires and the odd-numbered second routing wires may be formed on the other surface (for example, the upper surface) of the transparent substrate. Alternatively, the even-numbered first routing wires and the even-numbered second routing wires may be formed on one surface (for example, the lower surface) of the transparent substrate, and the odd-numbered first routing wires and the odd-numbered second routing wires may be formed on the other surface (for example, the upper surface) of the transparent substrate. Alternatively, the even-numbered first routing wires and the odd-numbered second routing wires may be formed on one surface (for example, the lower surface) of the transparent substrate, and the odd-numbered first routing wires and the even-numbered second routing wires may be formed on the other surface (for example, the upper surface) of the transparent substrate.

Figure 8:
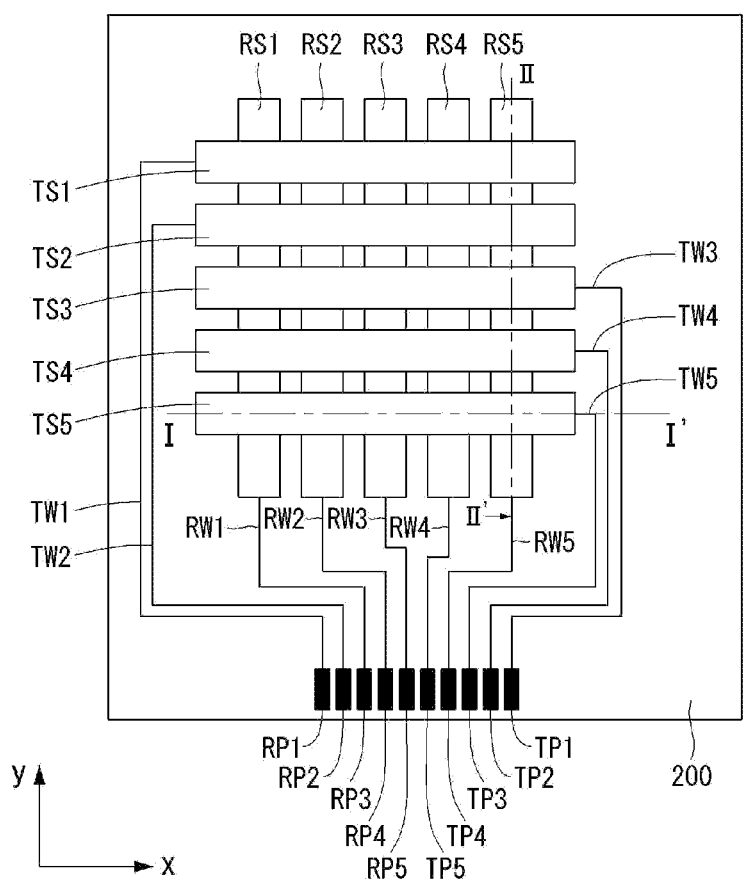
FIG. 8 is a plane view showing a modification embodiment of the touch screen panel according to the second embodiment of the invention.

FIG. 8 is a plane view showing a modification embodiment of the touch screen panel according to the second embodiment of the invention. The modification embodiment shown in FIG. 8 is different from the second embodiment of the invention, in that the first routing wires TW1 to TW5 are dividedly formed on both sides of the touch area A. Thus, only a difference between the second embodiment and the modification embodiment of the invention is described below.

As shown in FIG. 8, some TW1 and TW2 of the first routing wires TW1 to TW5 are formed on the left side of the touch area A, and the remaining first routing wires TW3, TW4, and TW5 are formed on the right side of the touch area A. In the same manner as the second embodiment shown in FIG. 7A, the odd-numbered first routing wires TW1, TW3, and TW5 and the even-numbered first routing wires TW2 and TW4 are alternately formed on one surface and the other surface of a transparent substrate 200.

The second embodiment shown in FIG. 7A and the modification embodiment shown in FIG. 8 illustrate that the first routing wires are connected only to one end of the first electrode serial, but are not limited thereto. For example, the embodiments of the invention may be applied to a double routing wiring structure, in which the first routing wires are connected to both ends of the first electrode serial and signals are transmitted and received through the both ends of the first electrode serial. In this instance, the odd-numbered first routing wires and the even-numbered second routing wires are alternately formed on one surface (for example, the lower surface) and the other surface (for example, the upper surface) of the transparent substrate. Hence, the same effect as the second embodiment of the invention may be obtained.

Figure 9:
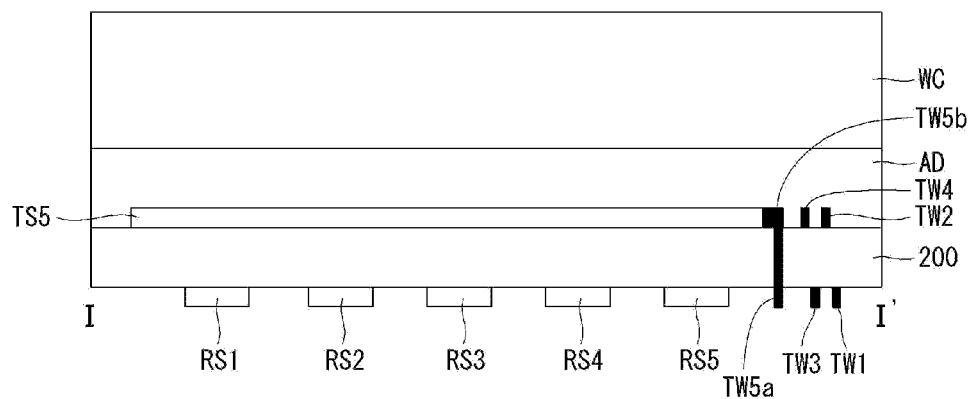
FIG. 9 is a cross-sectional view showing an example of applying a window cover to the touch screen panel according to the second embodiment of the invention.

Examples of applying a window cover, such as a reinforced glass, to the touch screen panel according to the second embodiment and the modification embodiment of the invention are described below with reference to FIG. 9. FIG. 9 is a cross-sectional view showing an example of applying a window cover to the touch screen panel according to the second embodiment of the invention.

As shown in FIG. 9, the touch screen panel according to the second embodiment of the invention is attached to a window cover WC, such as a reinforced glass, using an adhesive AD and thus may be used more stably. As described above, an additional effect capable of protecting the touch screen panel may be obtained by attaching the window cover WC to the touch screen panel.

As described above, in the touch screen panel according to the embodiments of the invention, because the odd-numbered routing wires and the even-numbered routing wires are formed on not the same layer but the different layers, it is not necessary to secure a distance between the odd-numbered routing wires and the even-numbered routing wires so that they do not contact each other. Thus, the size of the routing wiring area occupied by the routing wires may decrease, and thus the size of the bezel area may decrease.

For example, in the related art touch screen panel, assuming that a width of the routing wire is 10 μm, a proper separation distance between the adjacent routing wires is 30 μm, and the total number of channels is 51, the routing wires may occupy about 2 mm of the bezel area of the touch screen panel. On the other hand, in the touch screen panel according to the embodiments of the invention, the adjacent routing wires are formed on the different layers. Therefore, assuming that a separation distance between the adjacent routing wires is reduced to 10 μm and the total number of channels is 51, the routing wires may occupy about 1 mm of the bezel area of the touch screen panel. Hence, the embodiments of the invention can reduce the bezel area to about ½ of the related art touch screen panel.

Although embodiments have been described with reference to a number of illustrative embodiments thereof, it should be understood that numerous other modifications and embodiments can be devised by those skilled in the art that will fall within the scope of the principles of this disclosure. For example, the embodiments of the invention described that the first touch electrode serial is a driving electrode serial and the second touch electrode serial is a sensing electrode serial, but the reverse case is possible. Further, it should be understood that the number of first and second touch electrode serials, the number of first and second routing wires, and the number of first and second routing pads described in the embodiments of the invention are merely an example. The numbers may increase or decrease, if necessary or desired. Accordingly, the scope of the present invention should not be limited by the exemplary embodiments, but should be defined by the appended claims.

What is claimed is:
1. A touch screen panel, comprising:
a substrate having a touch area and a routing wiring area;
a plurality of first electrode serials which are disposed in the touch area of the substrate and are arranged in a first direction;
a plurality of second electrode serials which are disposed in the touch area of the substrate and are arranged in a second direction crossing the first direction so that the plurality of second electrode serials do not contact the plurality of first electrode serials;
a plurality of first routing wires which are disposed in the routing wiring area of the substrate and are respectively connected to one ends of the plurality of first electrode serials, the plurality of first routing wires being separated without connecting to each other; and a plurality of second routing wires which are disposed in the routing wiring area of the substrate and are respectively connected to one ends of the plurality of second electrode serials, the plurality of second routing wires being separated without connecting to each other, wherein odd-numbered first routing wires respectively connected to odd numbered first electrode serials and even-numbered first routing wires respectively connected to even numbered first electrode serials are disposed on different layers, and the odd-numbered first routing wires and the even-numbered first routing wires neighbored to each other are alternately disposed in the routing wire area, wherein the plurality of first electrode serials are disposed on a first surface of the substrate, wherein the plurality of second electrode serials are disposed on a second surface opposite the first surface of the substrate.

2. The touch screen panel of claim 1, wherein the odd-numbered first routing wires and the even-numbered first routing wires of the plurality of first routing wires are disposed on the first surface and the second surface of the substrate.

3. The touch screen panel of claim 1, wherein odd-numbered second routing wires and even-numbered second routing wires of the plurality of second routing wires are disposed on the first surface and the second surface of the substrate.

4. The touch screen panel of claim 3, wherein the odd-numbered first routing wires or the even-numbered first routing wires disposed on the first surface or the second surface of the substrate are respectively connected to odd-numbered first electrode serials or even-numbered first electrode serials disposed on the first surface or the second surface of the substrate through a contact hole in the substrate.

5. The touch screen panel of claim 3, wherein the odd-numbered second routing wires or the even-numbered second routing wires disposed on the first surface or the second surface of the substrate are respectively connected to odd-numbered second electrode serials or even-numbered second electrode serials disposed on the first surface or the second surface of the substrate through a contact hole in the substrate.

6. The touch screen panel of claim 1, further comprising a plurality of first routing pads and a plurality of second routing pads which are disposed in a pad area of the substrate.

7. The touch screen panel of claim 6, wherein the plurality of first routing pads are respectively connected to the plurality of first routing wires, and the plurality of second routing pads are respectively connected to the plurality of second routing wires.

8. The touch screen panel of claim 7, wherein odd-numbered first routing pads or even-numbered first routing pads disposed on the first surface or the second surface of the substrate are respectively connected to odd-numbered first routing wires or even-numbered first routing wires disposed on the first surface or the second surface of the substrate.

9. The touch screen panel of claim 3, wherein odd-numbered second pads or even-numbered second pads disposed on the first surface or the second surface of the substrate are respectively connected to the odd-numbered second routing wires or even-numbered second routing wires disposed on the first surface or the second surface of the substrate.

10. The touch screen panel of claim 1, wherein some of the plurality of first routing wires are disposed on a left side of the touch area, and others of the plurality of first routing wires are disposed on a right side of the touch area.

11. The touch screen panel of claim 1, wherein the plurality of first routing wires are disposed on a left side or a right side of the touch area.

* * * * *